United States Patent [19]
Asher

[11] 3,957,535
[45] May 18, 1976

[54] FUEL CELL HEAT AND MASS PLATE

[75] Inventor: William J. Asher, Panwood, N.J.

[73] Assignee: Exxon Research and Engineering Company, Linden, N.J.

[22] Filed: July 28, 1971

[21] Appl. No.: 166,746

[52] U.S. Cl. .............................. 136/86 E; 136/86 C
[51] Int. Cl.² ......................................... H01M 27/00
[58] Field of Search ......................... 136/86 C, 86 E

[56] References Cited
UNITED STATES PATENTS

| | | | |
|---|---|---|---|
| 3,370,984 | 2/1968 | Platner | 136/86 C |
| 3,476,601 | 11/1969 | Berger et al. | 136/20 X |
| 3,492,163 | 1/1970 | Hilmer | 136/86 C |
| 3,498,844 | 3/1970 | Sandersen | 136/86 C |
| 3,629,075 | 12/1971 | Gutbier | 136/86 C X |

Primary Examiner—Allen B. Curtis
Attorney, Agent, or Firm—Joseph J. Dvorak

[57] ABSTRACT

A novel method and apparatus is provided for controlling heat and mass inventory in a fuel cell. Heat and mass, e.g. water, generated in the cell are removed by heat transfer and capillary action.

2 Claims, 3 Drawing Figures

William J. Asher INVENTOR

FUEL CELL HEAT AND MASS PLATE

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

The present invention relates to method and apparatus for controlling the heat and mass inventory in a reactant plenum.

One of the major problems encountered in the development of fuel cells which employ oxygen containing gases as the oxidant and hydrogen containing gases as the fuel, is the removal of heat and water produced as a result of oxidizing the fuels. In order to maintain a steady state operation the reaction product must be removed at the same rate at which it is formed and an exchange of heat with the surroundings must take place. Any imbalance between the production and recovery rates of the reaction products can detrimentally affect the performance of the cell. For example, if product water is not adequately removed from a $H_2$—$O_2$ fuel cell the concentration of the electrolyte can be diluted and electrode flooding may even occur. Either of these events would dramatically alter the cell performance. In other types of cells, such as those using an ion exchange membrane as an electrolyte, a decrease in water vapor concentration in the cell can result in a drying out of the electrolyte and cell failure. Similarly, variations in temperature significantly reduce the performance of the cell through a combination of factors including changes in the vapor pressure of the electrolyte and changes in the rate of reaction.

Various means have been proposed for removing water and controlling the temperature within fuel cells. Thus, the art is replete with different arrangements of pumps and condensors for removing water and circulating coolant through the fuel cell. Systems of these types, of course, require significant power for their operation and consequently, reduce the otherwise high efficiency of fuel cells.

In some arrangements, heat exchange plates have been incorporated in fuel cells for transporting heat to the surface of fins extending external the fuel cell assembly. Not only are metal heat exchange plates heavy and cumbersome but unfortunately temperature gradients exist over the surface of the plate making precise and uniform temperature control virtually impossible.

Interestingly, heat control and mass inventory in fuel cells are generally handled by separate and distinct systems. In U.S. Pat. No. 3,370,984, for example, water is removed from the fuel cell by transport through a membrane and into a vapor cavity where it is expelled. Some of the heat produced in the cell is used to evaporate part of the water produced in the cell but this only accounts for about 20% of the total heat that must be removed. Consequently, cooling plates and fins or some other device is required for temperature control.

In addition to reducing the efficiency of fuel cells many of the prior art systems for controlling temperature and mass inventory within the cell tend to be large as well as expensive. In today's age of miniaturization sizing can be an acute problem.

SUMMARY OF THE INVENTION

In one aspect of the present invention, excess heat and mass generated in a reaction plenum of a fuel cell are removed by vapor heat transfer and capillary action. Heat is removed by transferring thermal energy to a condensed mass contained in a capillary membrane by vaporizing the condensed mass into a vapor plenum, transporting the vapor to a condensation zone where the vapor condenses thereby releasing the energy stored in its heat of vaporization and returning the recondensed vapor through the capillary membrane to remove additional heat as required. The condensed mass is the same substance as the mass requiring inventory control. Thus, when the mass produced in the reactant plenum transfers its thermal energy to the condensed mass in the capillary membrane there is an increase in the total amount of vapor in the vapor plenum in proportion to the amount of mass produced in the cell. This excess vapor is removed from the vapor plenum. Thus, both heat and mass inventory are simultaneously and simply controlled.

In another aspect of the present invention, a novel heat and mass plate is provided for controlling the heat and mass inventory in a fuel cell. In its simplest sense, this heat and mass plate comprises a capillary membrane which in combination with a fuel cell electrode and fuel cell housing defines a reactant plenum or mass transfer zone, and a vaporization plenum including a condensation zone. Excess heat and mass are transferred from the reactant plenum to condensed mass contained in the capillary membrane into a vaporization zone. The mass vapor in the vaporization zone is transported to a condensation zone where it rejects the heat energy to the external surroundings, and condenses in the upper portion of the capillary membrane. Capillary action returns the condensed mass through the membrane back to the capillary surface adjacent the reactant plenum for further heat removal. Excess water vapor in the vapor plenum, however, is expelled to the surroundings by means of pressure relief valves.

DETAILED DESCRIPTION OF THE DRAWINGS

Figure 1:
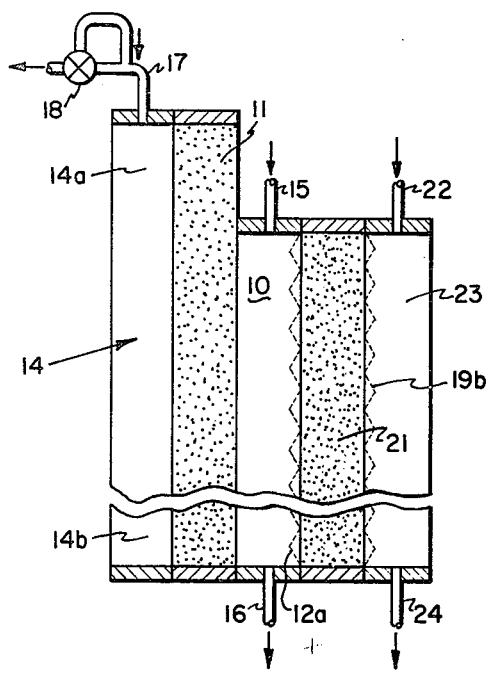
FIG. 1 is a schematic diagram illustrating a method of removing excess heat and mass from a reactant plenum in accordance with the present invention.

In FIG. 1, reference numeral 10 refers generally to a reactant plenum defined by capillary membrane 11 and enclosing walls 12 of a fuel cell housing. Capillary membrane 11 also defines with enclosing walls 12 a vaporization plenum 14. Vaporization plenum 14 has two zones, a condensation zone 14a and a vapor zone designated as 14b. Conduit 15 is provided for introducing materials into the reactant plenum. Where desirable conduit 16 is also provided to remove materials from the reactant plenum. Conduit 17 is also provided for removal of vapor from the vapor plenum 14. Conduit 17 is provided with a pressure relief valve 18, the purpose of which will be explained in greater detail subsequently.

As can be seen from FIG. 1, vaporization zone 14b and reactant plenum 10 qre separated by capillary membrane 11. Capillary membrane 11, however, extends beyond the reactant plenum 10 to define with the enclosing walls of the housing a condensation zone 14a.

In illustrating the present invention, walls 12a of reactant plenum 10 is shown as an anode. Cathode 19b is spaced apart from anode 12a by means of matrix 21 which contains an electrolyte. Line 22 is provided for introducing oxygen into the cathode plenum 23. Line 24 is present for removal of air from plenum 23.

Capillary membrane 11 can be made of any porous material which has a relatively high capillary potential. By capillary potential is meant the differential pressure required to force a liquid from its largest pore. Preferably, the capillary membrane will have a capillary potential of about 15 lbs. per square inch or even higher. Suitable materials that can be used as a capillary membrane include asbestos, potassium titanate, alumina and fiber mats.

Figure 2:
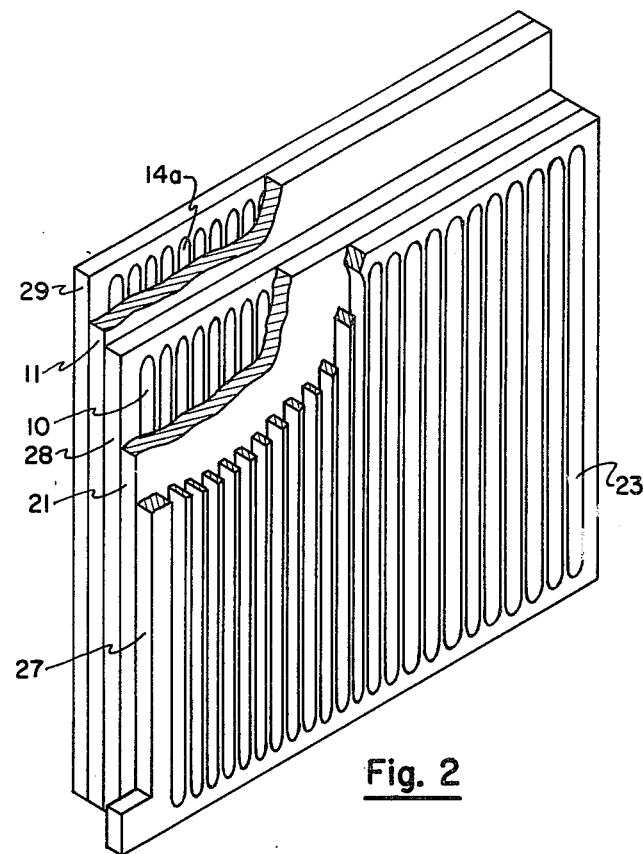
FIG. 2 is a front view, partially cut away, illustrating the construction of a single cell in accordance with this invention.

In fuel cell stack shown in FIG. 2 the capillary membrane 11 and electrolyte matrix 21 are potassium titanate sheet material. A typical preparation of such material involves suspending commercially available potassium titanate pigment in water to which 5 wt. % tetrafluoroethylene is added based on the amount of titanate. The suspension is filtered leaving a mat of titanate material that is readily separated from the filter paper. Thereafter the potassium titanate sheet is pressed at 5000 psi into a sheet having the desired capillary potential.

As can be seen from the FIG. 2 embodiment, matrix 21 has a surface area which is less than the surface area of membrane 11. Indeed, for this compact cell it is preferred that matrix 21 be 3½ inches by 4 inches while membrane 11 has an area of 4 inches by 4 inches, thereby leaving a projection of matrix 11 beyond the electrode structure for heat rejection as will be further explained.

The thickness of membrane 11 is 0.005 inches. Matrix 21 is 0.005 inches thick. Choice of thickness depends upon numerous considerations, such as requisite mechanical strength, desired porosity, and the required flow of water through the membrane and electrolyte through the matrix.

A catalytic metal is deposited on the anode and cathode side of matrix 21. For a thin fuel cell stack it is particularly advantageous to deposit the catalytic metal forming the electrodes on matrix 21 by means of a sputtering technique well known in the art. In this manner, extremely thin, yet conductive layer of catalytic metal can be deposited on the matrix. However, other techniques may be employed for depositing catalytic metals. Electroless deposition, for example, is a convenient technique for depositing catalytic metals on a non-conductive surface.

Any number of electrode catalysts can be employed in practicing the present invention. Metals such as platinum, platinum alloys, palladium and nickel are particularly useful as anode catalysts in $H_2$—$O_2$ fuel cells. Suitable cathode catalysts include materials such as carbon, platinum and silver.

As shown in FIG. 2, plaque 27 is provided for current collection and for defining cavity or oxygen plenum 23. Plaque 28 is also provided to serve as a current collector for the anode and to define with matrix 11 a reactant plenum or mass transfer zone 10. Plaques 27 and 28 may be connected externally by any suitable means for removal of current from the cell. Plaque 29 serves as a support for matrix 11 as well as defining with matrix 11 a vapor plenum 14.

Plaques 27 and 28 may be prepared from any suitable material having the requisite mechanical and electrical properties. In the cell shown in FIG. 2 a slotted nickel sheet 0.005 inches thick was used for plaques 27 and 28. Plaque 29 does not have to be electrically conducting and consequently any material having the requisite mechanical strength can be utilized. For the cell shown in FIG. 2, plaque 29 was made of slotted polyethylene 0.005 inches thick. Obviously, other polymeric materials may be employed and used in lieu of polyethylene.

Similarly, other types of materials can be employed in spacing the electrode from membrane 11 and for defining a reactant plenum therebetween. The above-mentioned materials, however, are particularly useful in assembling a fuel cell unit which is about 0.02 inches in thickness.

Numerous units, of course, can be stacked or assembled to provide a power pack having the desired power output.

In the FIG. 1 and FIG. 2 arrangements, anode 12a is placed adjacent to membrane 11. In operation, heat is generated and product mass produced by chemical reaction of the fuel and oxidant at the reaction interface formed by the electrolyte containing matrix 21.

With a hydrogen fuel and air as oxidant water is produced in the cell. Heat also is generated. The water is removed from reactant plenum 10 by displacing and vaporizing liquid water in membrane 11. The water is evaporated from the membrane into the vaporization plenum because the vapor side of membrane 11 is maintained at a lower water partial pressure. Pressure in vaporization plenum 14 is controlled automatically by a pressure relief valve 18 which permits expelling excess water vapor from the cell.

Some of the heat generated within the cell will be removed by virtue of having vaporized the excess water present. However, additional heat is efficiently removed by heat of vaporization and capillary action as follows: water is vaporized from membrane 11, which is adjacent the reactant plenum, into the vapor plenum and the water vapor moves through the vapor space to the condensation zone 14a. Here the water vapor is condensed rejecting heat to the surroundings. The condensed water is drawn back into the fuel cell stack through the matrix 11 by capillary action. Hence, most of the water evaporated from matrix 11 is condensed and returned to the fuel cell stack for controlling the temperature in the stack. This is a very significant feature of the present invention since temperature control without a significant temperature gradient across the stack is attainable.

It will be appreciated that by simply increasing the pressure in plenum 14 will result in an increase in the boiling point of water in the matrix. Therefore the temperature of the membrane surface can be fixed by setting the water vapor or pressure in the vapor plenum. Optionally, a membrane with an ion exchange capacity can be used in which the concentration of counter ions in the water effectively elevates the boiling point of water.

Figure 3:
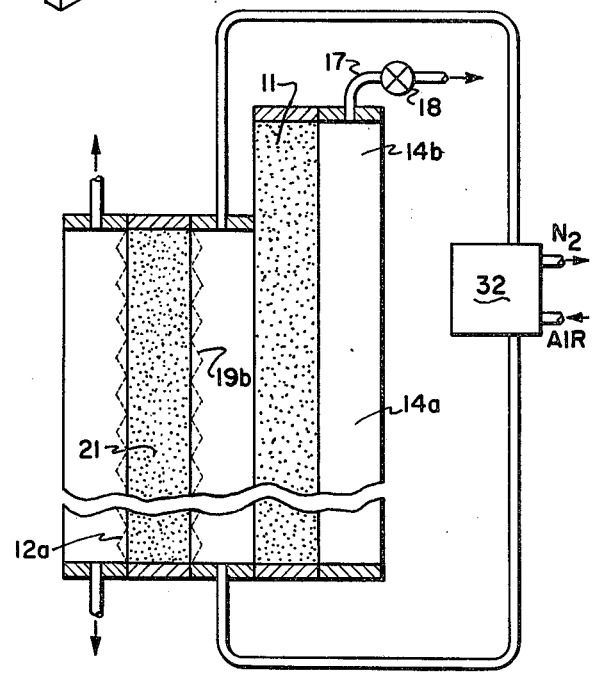
FIG. 3 is a schematic diagram illustrating another variation of a fuel cell utilizing the heat and mass plate of this invention.

Referring now to FIG. 3, yet another variation of a fuel cell utilizing the heat and mass plate of the present invention is shown. In this embodiment membrane 11 is positioned adjacent to cathode 19b. Methanol is used as the fuel and air as the oxidant. To assure continuous operation, an acid or buffered electrolyte is employed which will reject the $CO_2$ produced by the electrochemical reaction taking place in the cell. Heat is controlled in the same manner as previously described. Water is vaporized from membrane 11 in plenum 14a. The heat energy of the vapor is subsequently expelled to the surroundings by recondensation of the water in condensation zone 14b. Capillary action returns the water to the cell to complete the cycle. Temperature is set by controlling the partial pressure of water vapor in the respective components and plenums. A pressure relief valve 18 is used to control the water inventory in the cell. Excess water vapor will be expelled from plenum 14 by means of valve 18. In the FIG. 3 embodiment of the present invention the composition of the air is controlled by a suitable device designated as 32 so that water and heat removed from the cell by the heat and mass plate will be a function of cell operating conditions and independent of any change in humidity of the ambient air. A suitable device for controlling the air composition is described in U.S. Pat. No. 2,944,627.

What is claimed is:

1. A method for controlling heat and mass inventory in a fuel cell comprising the steps of:
   producing product mass at an electrode of said cell;
   transporting said product mass to one side of a capillary membrane;
   condensing substantially all of said mass on said one side of said capillary membrane;
   vaporizing said condensed vapor mass at the other side of said membrane in a vaporization zone;
   removing excess vapor from said vaporization zone thereby controlling the mass inventory;
   transporting balance of said vapor to a condensation zone;
   condensing said vapor in said condensation zone on said capillary membrane thereby rejecting the heat of said vapor to the surroundings; and
   returning said condensed vapor through said capillary membrane to again be vaporized thereby removing heat from said reactant plenum.
2. The method of claim 1 wherein said mass is water.

* * * * *